M. C. A. LATOUR.
ALTERNATING CURRENT MOTOR.
APPLICATION FILED AUG. 17, 1907.
909,193.
Patented Jan. 12, 1909.
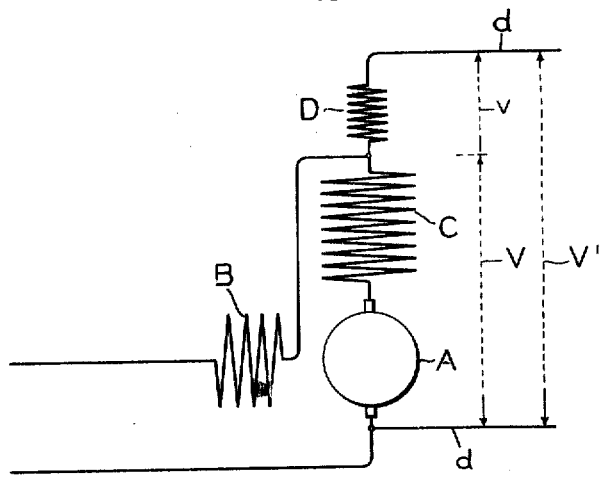
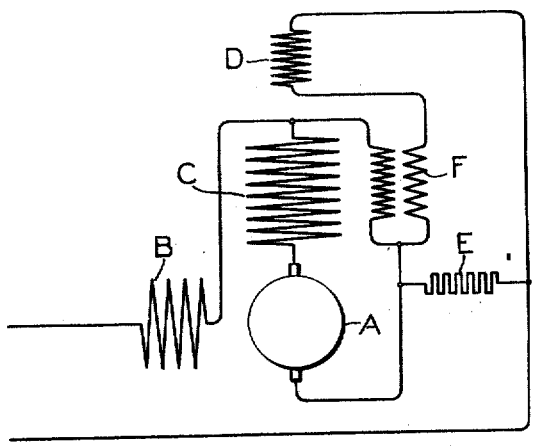
Witnesses.
George H. Tilden.
J. Ellis Glen
Inventor:
Marius C. A. Latour,
by Albert G. Davis
Att'y.

UNITED STATES PATENT OFFICE.

MARIUS C. A. LATOUR, OF PARIS, FRANCE, ASSIGNOR TO GENERAL ELECTRIC COMPANY, A CORPORATION OF NEW YORK.

ALTERNATING-CURRENT MOTOR.

No. 909,193.

Specification of Letters Patent.

Patented Jan. 12, 1909.

Application filed August 17, 1907. Serial No. 388,993.

*To all whom it may concern:*

Be it known that I, MARIUS C. A. LATOUR, a citizen of France, residing at Paris, France, have invented certain new and useful Improvements in Alternating-Current Motors, of which the following is a specification.

My invention relates to alternating-current motors of the commutator type, in which an auxiliary commutating field is produced for balancing the electromotive forces induced in the armature coils short-circuited by the brushes.

The object of my invention is to provide a novel arrangement of the connections of the commutating coils adapted to give good commutation over wide ranges of speed.

In an alternating-current motor of the commutator type, the armature coils short-circuited by the brushes are subjected to the alternating field of the motor, so that there is produced in these coils by transformer action a voltage ninety degrees out of phase with the motor current. For counter-balancing this voltage in the short-circuited coils, a commutating field is required, which is ninety degrees out of phase with the motor currents, and which may consequently be produced by impressing on the commutating coils a voltage in phase with the motor currents, since the current in the commutating coils lags nearly ninety degrees behind the voltage impressed on their terminals. If a simple shunt connection is employed for the commutating coils, the strength of the field produced by the commutating coils remains constant, so that the voltage induced in the short-circuited armature coils, by cutting this field, increases with the speed. The electromotive forces induced by transformer action in the short-circuited coils is independent of the speed, and varies with the current, which tends to decrease as the motor speed increases. Therefore, a simple shunt connection with the commutating coils can give good commutation for one speed only. By my invention an automatic regulation of the strength of the auxiliary commutating field is obtained, in accordance with the speed of the motor. I secure this result by impressing on the commutating coils the resultant of two voltages, of which the smaller increases with increase of speed. The voltage at the terminals of the motor armature or a voltage proportional thereto may be employed for the smaller of the two opposing voltages impressed on the commutating coil, since the armature voltage increases with the increase of speed. Such an arrangement results in decreasing the strength of the commutating field with increase of speed, so that good commutation is obtained over a wide range of speed.

My invention will best be understood by reference to the accompanying drawings, in which—

Figure 1 is an explanatory diagram, and Fig. 2 shows the preferred connections of the commutating coil.

In the drawings, A represents the armature, B the field, C the compensating winding of an alternating-current compensated series motor.

D represents the commutating coil or coils for producing the commutating field for neutralizing the voltage induced in the short-circuited armature coils by transformer action of the field or exciting coils B. If the coil D is connected as shown, and if the leads $d$ are connected to a suitable source of voltage opposing the voltage of the motor armature between the leads $d$, then the voltage across the terminals of the coil D will be $v = V^1 - V$, in which $V^1$ represents the voltage from the outside source, and V the voltage across the armature terminals. Since the voltage V increases with increase of speed, the voltage $v$, and consequently the strength of the commutating field, will diminish with increase of speed. This decrease in the strength of the commutator field is necessary for good commutation over wide ranges of speed, since, if the strength of the commutating field should remain constant, the voltage induced in the short-circuited coil by cutting it would increase with increase of speed.

The voltage $V^1$ may be derived from any suitable source. It is not necessary that this voltage should be exactly in phase with the voltage across the armature terminals of the motor. There is a second source of voltage in the short-circuited armature coils tending to produce sparking,—viz., electromotive force of commutation-reactance, and this electromotive force which is in phase with the armature current may be counterbalanced by slightly dephasing voltage $V^1$ with respect to V. The phase of the voltage $V^1$ may be regulated in any well known way.

If, instead of employing the armature voltage directly for regulating the strength of the commutating field, a smaller voltage proportional to the armature voltage is employed, the voltage $V^1$ may be small and may be derived from the ohmic drop in a resistance in series with the motor. Such an arrangement is shown in Fig. 2, in which E represents a resistance in series with the motor, and F a small transformer, the primary of which is in shunt to the compensating and armature windings, while the secondary is in series with the commutating coil. The voltage drop across the resistance E, which corresponds to the voltage $V^1$ of Fig. 1, varies with the motor current only, while the voltage at the secondary terminals of transformer F, corresponding to V in Fig. 1, is proportional to the armature voltage, which varies both with the strength of field, and consequently the motor current, and with the motor speed. The voltage across the commutating coil which is maximum at starting, gradually decreases as the motor speeds up, owing to the increase of voltage in transformer F.

I do not desire to limit myself to the particular connections here shown, but aim in the appended claims to cover all modifications which are within the scope of my invention.

What I claim as new and desire to secure by Letters Patent of the United States, is,—

1. In an alternating-current motor of the commutator type, a commutating coil, and connections therefor including means for impressing on the coil the resultant of two voltages, of which the smaller increases with increase of speed.

2. In an alternating-current motor of the commutator type, a commutating coil, and connections therefor including means for impressing on the coil the resultant of two voltages, the smaller of said two voltages being proportional to the voltage at the armature terminals.

3. In an alternating-current motor of the commutator type, a commutating coil, and circuit connections for said coil including two sources of opposing voltages, the smaller of said voltages increasing with the speed.

4. In an alternating-current motor of the commutator type, a commutating coil, and circuit connections for said coil including two sources of opposing voltages, the smaller of said voltages being proportional to the voltage at the armature terminals.

5. In an alternating-current motor of the commutator type, a commutating coil, a resistance in series with the motor and in shunt to said coil, and a source of voltage increasing with the speed of the motor opposing the flow of current through said coil due to the voltage drop in said resistance.

6. In an alternating-current motor of the commutator type, a commutating coil, a resistance in series with the motor and in shunt to said coil, and a transformer having its primary in shunt to the motor armature and its secondary in series with said coil.

7. In an alternating-current motor of the commutator type, a commutating coil, and means for impressing on said coil the resultant of two opposing voltages one proportional to the motor current and the other proportional both to the motor current and to the speed.

In witness whereof, I have hereunto set my hand this 12th day of August 1907.

MARIUS C. A. LATOUR.

Witnesses:
BENJAMIN B. HULL,
HELEN ORFORD.